(12) United States Patent
Conti et al.

(10) Patent No.: US 11,410,031 B2
(45) Date of Patent: Aug. 9, 2022

(54) DYNAMIC UPDATING OF A WORD EMBEDDING MODEL

(71) Applicant: International Business Machines Corporation, Armonk, NY (US)

(72) Inventors: Thomas Conti, Poughkeepsie, NY (US); Stephen Warren, Jopewell Junction, NY (US); Rajesh Bordawekar, Millwood, NY (US); Jose Neves, Poughkeepsie, NY (US); Christopher Harding, Port Jervis, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 889 days.

(21) Appl. No.: 16/204,408

(22) Filed: Nov. 29, 2018

(65) Prior Publication Data
US 2020/0175360 A1    Jun. 4, 2020

(51) Int. Cl.
*G06N 3/08* (2006.01)
*G06K 9/62* (2022.01)
(Continued)

(52) U.S. Cl.
CPC .......... *G06N 3/08* (2013.01); *G06F 16/2282* (2019.01); *G06F 16/284* (2019.01);
(Continued)

(58) Field of Classification Search
CPC ........ G06N 3/08; G06N 3/04; G06F 16/2282; G06F 16/284; G06F 16/3347;
(Continued)

(56) References Cited

U.S. PATENT DOCUMENTS 9,430,563 B2    8/2016    Clinchant et al.
9,922,025 B2    3/2018    Cross, III et al.
(Continued)

OTHER PUBLICATIONS

Ethan Fast et al., "Lexicons on Demand: Neural Word Embeddings for Large-Scale Text Analysis", Proceedings of the Twenty-Sixth International Joint Conference on Artificial Intelligence (IJCAI-17), Melbourne, Australia Aug. 19-25, 2017, 5 pgs.
(Continued)

*Primary Examiner* — Juan A Torres
(74) *Attorney, Agent, or Firm* — Cantor Colburn LLP; Teddi Maranzano

(57) ABSTRACT

Methods, systems and computer program products for updating a word embedding model are provided. Aspects include receiving a first data set comprising a relational database having a plurality of words. Aspects also include generating a word embedding model comprising a plurality of word vectors by training a neural network using unsupervised machine learning based on the first data set. Each word vector of the plurality of word vector corresponds to a unique word of the plurality of words. Aspects also include storing the plurality of word vectors and a representation of a hidden layer of the neural network. Aspects also include receiving a second data set comprising data that has been added to the relational database. Aspects also include updating the word embedding model based on the second data set and the stored representation of the hidden layer of the neural network.

25 Claims, 11 Drawing Sheets

(51) Int. Cl.
*G06F 16/28* (2019.01)
*G06N 3/04* (2006.01)
*G06F 16/22* (2019.01)
*G06F 16/33* (2019.01)

(52) U.S. Cl.
CPC ....... *G06F 16/3347* (2019.01); *G06K 9/6256* (2013.01); *G06K 9/6262* (2013.01); *G06N 3/04* (2013.01)

(58) Field of Classification Search
CPC .... G06F 16/23; G06K 9/6256; G06K 9/6262; G06V 10/82
USPC .......................................................... 706/15
See application file for complete search history.

(56) References Cited

U.S. PATENT DOCUMENTS

| | | | |
|---|---|---|---|
| 9,947,314 B2 | 4/2018 | Cao et al. | |
| 10,019,438 B2 | 7/2018 | Audhkhasi et al. | |
| 2015/0220833 A1* | 8/2015 | Le | G06N 3/08 706/16 |
| 2016/0162467 A1 | 6/2016 | Munro et al. | |
| 2016/0350288 A1 | 12/2016 | Wick et al. | |
| 2016/0358094 A1 | 12/2016 | Fan et al. | |
| 2017/0011289 A1 | 1/2017 | Gao et al. | |
| 2017/0139984 A1 | 5/2017 | Bordawekar et al. | |
| 2017/0270100 A1 | 9/2017 | Audhkhasi et al. | |
| 2018/0068371 A1 | 3/2018 | Krishnamurthy et al. | |
| 2018/0090128 A1 | 3/2018 | Kurata et al. | |
| 2018/0113938 A1 | 4/2018 | Piramuthu et al. | |
| 2018/0157644 A1 | 6/2018 | Mandt et al. | |
| 2018/0189265 A1 | 7/2018 | Chen et al. | |
| 2018/0196800 A1 | 7/2018 | Volkovs et al. | |
| 2018/0267976 A1 | 9/2018 | Bordawekar et al. | |
| 2018/0267977 A1 | 9/2018 | Bandyopadhyay et al. | |
| 2018/0268025 A1 | 9/2018 | Bandyopadhyay et al. | |
| 2019/0286704 A1* | 9/2019 | Volkovs | G06F 40/289 |
| 2020/0057936 A1* | 2/2020 | Haeusser | G06N 3/0454 |
| 2020/0104367 A1* | 4/2020 | Tagra | G06K 9/627 |
| 2020/0159832 A1* | 5/2020 | Cai | G06F 40/30 |

OTHER PUBLICATIONS

Hamed Zamani et al., "Relevance-based Word Embedding", In Proceedings of the 40th International ACM SIGIR Conference on Research and Development in Information Retrieval (SIGIR '17). ACM, New York, NY, USA, 10 pgs.

List of IBM Patents or Patent Applications Treated as Related; (Appendix P), Filed Nov. 30, 2018; 2 pages.

Pranava Swaroop Madhyastha et al., "Mapping Unseen Words to Task-Trained Embedding Spaces", Proceedings of Workshop on Representation Learning for NLP, ACL 2016, Berlin, Germany, 11 pgs.

Rajesh Bordawekar et al., "Cognitive Database: A Step towards Endowing Relational Databases with Artificial Intelligence Capabilities", The Computing Research Repository (CoRR), Dec. 2017, 14 pgs.

Rajesh Bordawekar et al., "Enabling Cognitive Intelligence Queries in Relational Databases using Low-dimensional Word Embeddings", The Computing Research Repository (CoRR), Mar. 2016, 12 pgs.

Thomas Conti, et al., "Word Embedding Model Parameter Advisor", U.S. Appl. No. 16/204,486, filed Nov. 29, 2018.

Ziqian Zeng et al., "Socialized Word Embeddings", Proceedings of the Twenty-Sixth International Joint Conference on Artificial Intelligence (IJCAI-17), Melbourne, Australia Aug. 19-25, 2017, 7 pgs.

* cited by examiner

DYNAMIC UPDATING OF A WORD EMBEDDING MODEL

BACKGROUND

The present invention generally relates to word embedding models, and more specifically, to dynamically updating a word embedding model.

Word embedding generally involves a set of language modeling and feature learning techniques in natural language processing (NLP) in which words and phrases from a vocabulary of words are mapped to vectors of real numbers ("word vectors") comprising a word embedding model. Word embedding models may typically be generated by training a neural network using machine learning based on a data from, for example, a relational database. This process requires a large number of computations and thus, generally requires a large amount of processing resources and time to generate the resultant word embedding model. Once generated, the word embedding model may then be queried to reveal various relationships between data, such as for example, determining similarity between entities.

Conventionally, when new data is added to the relational database that served as the basis for the word embedding model, the model must be recreated by repeating the process of training the neural network with all of the data from the relational database. Thus, using conventional methods, a great amount of processing time and resources are expended every time a word embedding model is created to incorporate data that was newly added to the underlying relational database that forms the basis of the model. For example, it may take days to retrain the neural network with the augmented data set. In addition to adding significant development time to model generation and increased utilization of computing resources, such delays also decrease the usefulness of the word embedding models by preventing up-to-date queries from being run against the model. For example, in the time it takes to generate a new word embedding model that incorporates new data added to the underlying relational database, it is possible that more new data has since been added to the underlying relational database, which would mean the resultant word embedding model is not fully up-to-date. An inability to generate a new word embedding model with up-to-date data can limit word embedding model use in various applications, such as applications involving real-time or streaming data.

SUMMARY

Embodiments of the present invention include methods, systems, and computer program products for updating a word embedding model. A non-limiting example of a computer-implemented method includes receiving a first data set comprising a relational database having a plurality of words. The method further includes generating a word embedding model comprising a plurality of word vectors by training a neural network using unsupervised machine learning based on the first data set. Each word vector of the plurality of word vectors corresponds to a unique word of the plurality of words. The method further includes storing the plurality of word vectors and a representation of a hidden layer of the neural network. The method further includes receiving a second data set that is data that has been added to the relational database. The method further includes updating the word embedding model based on the second data set and the stored representation of the hidden layer of the neural network. Advantages can include enabling model based queries without required the query target data to be pre-built into the model. Further advantages include dynamic updating of a word embedding model without incurring the large cost of allocating processing resources required to train the original model and avoidance of the significant time delay incurred by retraining the model.

In addition to one or more of the features described above or below, or as an alternative, further embodiments may include the relational database being a table comprising rows and columns and the second data set being a new row that has been added to the table. Advantages can also include providing support for updating of homogenous database data.

In addition to one or more of the features described above or below, or as an alternative, further embodiments may include that training the neural network using unsupervised machine learning based on the first data set includes determining one or more weights and biases associated with one or more neurons of the hidden layer of the neural network and storing a representation of the hidden layer of the neural network includes storing the determined one or more weights and biases associated with the one or more neurons of the hidden layer. Advantages can also include providing a user with the ability to train on an existing model as the base, rather than generating a new model.

In addition to one or more of the features described above or below, or as an alternative, further embodiments may include that the second data set is a set of words and each word of the set of words is included in the plurality of words of the relational database, and that updating the word embedding model based on the second data set and the stored representation of the hidden layer of the neural network includes updating a set of word vectors that corresponds to the set of words, wherein the set of word vectors is a subset of the plurality of word vectors. Advantages can also include limiting the processing required to update the model by limiting the update to portions of the neural network that are associated with the words included in the additional relational database data.

In addition to one or more of the features described above or below, or as an alternative, further embodiments may include that the second data set is a set of words and one or more new words, wherein the one or more new words are not included in the plurality of words of the relational database, and updating the word embedding model based on the second data set and the stored representation of the hidden layer of the neural network includes updating a set of word vectors that corresponds to the set of words and generating one or more new word vectors that correspond to the one or more new words, wherein the set of word vectors is a subset of the plurality of word vectors. Advantages can also include limiting the processing required to update the model by limiting the update to portions of the neural network that are associated with the words included in the additional relational database data and portions required to add the new one or more words.

In addition to one or more of the features described above or below, or as an alternative, further embodiments may include updating the word embedding model by updating a portion of the neural network based on the second data set. Advantages can also include limiting the processing required to update the model by limiting the update to a portion of the neural network.

In addition to one or more of the features described above or below, or as an alternative, further embodiments may include updating a portion of the neural network based on the second data set and that by updating the hidden layer to adjust weights and biases associated with neurons of the hidden layer based on the second data set and the method also includes storing a representation of the updated hidden layer. Advantages can also include providing the ability to incrementally update the word embedding model with further new data without retraining the model.

In addition to one or more of the features described above or below, or as an alternative, further embodiments may include that generating the word embedding model based on the first data set includes applying selected parameters to the first data set and a training of the neural network and that updating the word embedding model based on the second data set includes applying the selected parameters to the second data set and an incremental training of the neural network. Advantages can also include maintaining consistency of data integration during an update of the model.

Embodiments of the present invention include methods, systems, and computer program products for updating a word embedding model based on streaming data. A non-limiting example of a computer-implemented method includes receiving streaming data and continuously storing the streaming data as it is received. The method includes responsive to storing a first set of streaming data and determining that the first set of streaming data includes an amount of data that exceeds a first predetermined threshold, generating a word embedding model by training a neural network using unsupervised machine learning based on the first set of streaming data. The word embedding model includes a plurality of word vectors and each word vector of the plurality of word vectors corresponds to a unique word of the plurality of words. The method includes storing the plurality of word vectors and a representation of a hidden layer of the neural network. In response to storing a second set of streaming data, the method includes determining that an amount of the second set of streaming data exceeds a second predetermined threshold. The second set of streaming data is received chronologically after the first set of streaming data. The method further includes updating the word embedding model to create a first updated word embedding model based on the second set of streaming data and the stored representation of the hidden layer of the neural network. Advantages can include allowing automatic word embedding model updating in near real time based on streaming data.

In addition to one or more of the features described above or below, or as an alternative, further embodiments may include that training the neural network using unsupervised machine learning based on the first data set of streaming data includes determining one or more weights and biases associated with one or more neurons of the hidden layer of the neural network and that storing a representation of the hidden layer of the neural network includes storing the determined one or more weights and biases associated with the one or more neurons of the hidden layer. Advantages can also include providing the system with the ability to train on an existing model as the base, rather than generating a new model.

In addition to one or more of the features described above or below, or as an alternative, further embodiments may include that updating the word embedding model to create a first updated word embedding model includes incrementally training the neural network based on the second set of streaming data and the stored representation of the hidden layer of the neural network to adjust one or more weights and biases associated with one or more neurons of the hidden layer of the neural network. Advantages can also include limiting the processing required to update the model by limiting the update to portions of the neural network that are associated with the words included in the additional relational database data.

In addition to one or more of the features described above or below, or as an alternative, further embodiments may include that updating the word embedding model to create a first updated word embedding model comprises updating a portion of the neural network to adjust weights and biases associated with neurons of the hidden layer based on the second set of streaming data and the method further includes storing a representation of an updated hidden layer, determining that an amount of a third set of streaming data exceeds the second predetermined threshold in response to storing the third set of streaming data and updating the first updated word embedding model to create a second updated word embedding model based on the third set of streaming data and the stored representation of the updated hidden layer of the neural network. The third set of streaming data is received chronologically after the second set of streaming data. Advantages can also include automatic iterative updating of the word embedding model based on streaming data.

In addition to one or more of the features described above or below, or as an alternative, further embodiments may include that responsive to receiving a query of the word embedding model during streaming of the streaming data and before updating the word embedding model to create the first updated word embedding model, generating results of the query based on the word embedding model, responsive to receiving a query of the word embedding model during streaming of the streaming data, after updating the word embedding model to create a first updated word embedding model and before updating the word embedding model to create the second updated word embedding model, generating results of the query based on the first updated word embedding model, and responsive to receiving a query of the word embedding model during streaming of the streaming data and after updating the word embedding model to create the second updated word embedding model, generating results of the query based on the second updated word embedding model. Advantages can also include enabling a user to query a word embedding model derived from streaming data to receive results that are based on an updated model that incorporates near real time data.

A system for updating a word embedding model includes a memory having computer readable computer instructions, and a processor for executing the computer readable instructions that execute the steps of the computer-implemented method described above. A computer program product for updating a word embedding model includes a computer readable storage medium having program instructions embodied therewith to execute the steps of the computer-implemented method described above. A system for updating a word embedding model based on streaming data includes a memory having computer readable computer instructions, and a processor for executing the computer readable instructions that execute the steps of the computer-implemented method described above. A computer program product for updating a word embedding model based on streaming data includes a computer readable storage medium having program instructions embodied therewith to execute the steps of the computer-implemented method described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
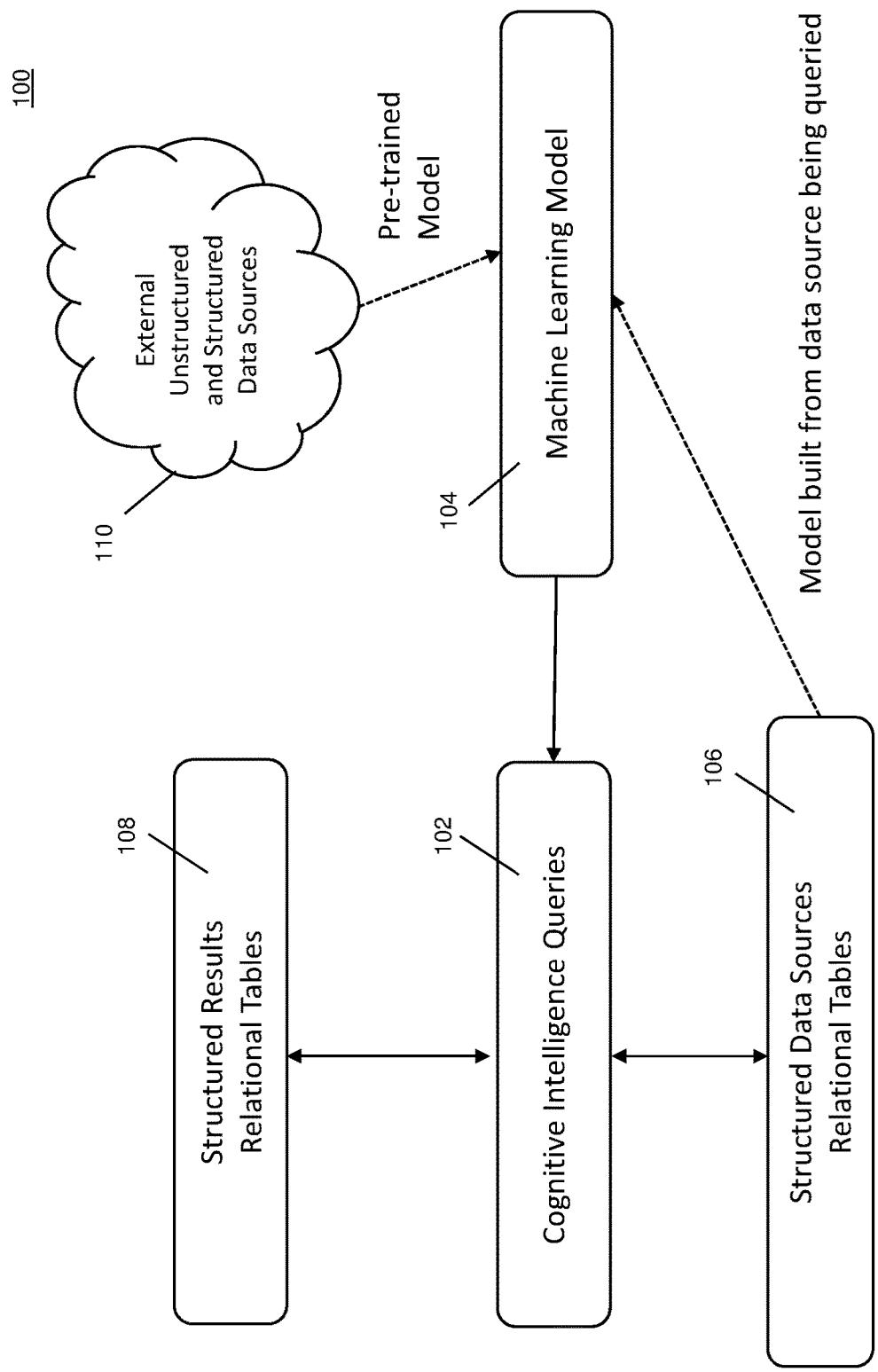
FIG. 1 is a block diagram illustrating one example of an operating environment in accordance with the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As described above, generating word embedding models by training a neural network based on relational databases generally requires a large amount of processing time and resources. For example, the process of training a neural network to generate a word embedding model may take days. Unsurprisingly, this can significantly inhibit the development and use of such models. Further, for real world applications, it is often expected that the source data used to generate the word embedding model is not static, but rather will be augmented over time. For example, new data entries may be added to a relational database that is used to train a word embedding model. It may be desirable to update the word embedding model to incorporate such newly added data, however conventional techniques for doing so require the complete retraining of the word embedding model with the entirety of the relational database data (i.e., both the old and new relational database data), which incurs the high cost processing of training the model and introduces significant delay the availability of the updated model for use in querying.

The present disclosure solves the problem of incorporating new data into a word embedding model without the need to entirely retrain the model by providing novel techniques for incrementally and/or dynamically updating a word embedding model by generating an update to the model based on the new data and a stored portion of the previously trained neural network. As disclosed herein, computer-implemented methods enable relational databases to capture and exploit semantic contextual similarities using standard SQL queries and a class of SQL-based queries known as Cognitive Intelligence (CI) queries. For the results of such CI queries to remain useful, when new data is introduced to the underlying relational database from which the word embedding model was derived, it is necessary to account for the new data in the model as well. Thus, the word embedding model updating techniques described herein can provide an updated word embedding model that takes newly added data into account so that users may query the updated model in a timely fashion, relative to when the new data was added to the underlying relational database. Further, a word embedding model can be iteratively and incrementally updated using the disclosed techniques, which enables the model to be continually updated without repeatedly incurring the cost of retraining the entire model.

The techniques described herein allow for the process of generating a word embedding model that incorporates and reflects newly added data to be performed significantly faster and using less processing power than conventional methods. Accordingly, the disclosed solution provides technical advantages of significantly reducing the amount of computer processing resources and time needed to generate a word embedding model that is reflective of newly added data. These techniques also provide additional advantages of reducing the overall development time of a word embedding model. For example, a developer may often have to "guess and check" when selecting parameters of a word embedding model that will generating meaningful results.

In some instances where a developer is trying to determine whether a given set of model parameters yields a model with meaningful results, it may be helpful for the developer to add new data to the model to assess the impact of the new data on the meaningfulness of the results in order to assess whether the model parameters should be changed. However, iteratively adding new data to a word embedding model during development may be cost prohibitive under conventional approaches, as the developer may not be able to afford to wait multiple days between each update of the model. Accordingly, the techniques disclosed herein also allow for improved word embedding model development.

The incremental updating of word embedding models may be particularly useful in the context of a model based query that returns a similarity or dissimilarity result set does not contain the data that identifies what data the user desires the result set to be similar or dissimilar to, such as for example, querying a model of known criminals with a witness description of a particular suspect that was not previously part of the data of the relational database. In this case, the techniques described herein may allow the model to be quickly updated so that a potential list of matching suspects may generated in a timely fashion without having to wait days for the model to be retrained to incorporate the new suspect data. The disclosed techniques can provide the further benefit of allowing new applications of word embedding models that were previously unrealistic, such as for example, applications based on real-time, near real-time or streaming data, which may require the word embedding model to iteratively update with new data in a short time frame.

For a given relational database, such as a database containing information about employees of a specific company, typical SQL queries only return a result if there is a match for the query. For example, if a query wants information for employee A, such as salary, title, etc., an answer is returned only if there is an employee A. However, using CI queries, an answer may be returned by examining the relationship of each word embedded in the database by querying a word embedding model developed based on the database. For traditional SQL purposes, attributes such as name, age, gender, title, etc., are independent and this information is not exploited by the query.

Some embodiments of the present disclosure use word embedding, which is an unsupervised machine learning technique from natural language processing (NLP), to extract latent information. Disclosed techniques may also be applicable to other data models such as Multidimensional online analytical processing (MOLAP), JavaScript Object Notation (JSON), eXtensible Markup Language (XML), comma-separated value (CSV) files, spreadsheets, etc.

In word embedding, a d-dimensional vector space is fixed. Each word in a text corpus (e.g., collection of documents) is associated with a dimension d vector of real numbers. The assignment of words to vectors should be such that the vectors encode the meaning of the words. Ideally, if two words are closely related (i.e. have similar meaning), their vectors should point in similar directions. In other words, the cosine distance between their vectors should be relatively high. By closely related words we mean words that appear together often in the text corpus. By appear together, we mean within close proximity. Conversely, if words are unrelated, the cosine distance between their vectors should be relatively small. Some refinements of the calculation of closeness weigh the proximity and/or consider grammar rules.

Over the last few decades, a number of methods have been introduced for computing vector representations of words in a natural language, such as word2vec or GloVe. Recently, word2vec has gained prominence as the vectors produced appear to capture syntactic as well semantic properties of words. These vector representations seem to capture closeness of words and syntactic (e.g., present-past, singular-plural) as well as semantic closeness of words. One application of word2vec produced vectors was in solving analogy problems, such as . . . a king is to a man like what is to a woman? (answer: queen) by using vector algebra calculations.

Vectors may be produced by either learning on the database itself or using external text, or vector sources. In the relational database context, one way of generating vectors is to apply the word embedding method to a token sequence generated from the database: each row would correspond to a sentence and a relation would correspond to a document. Thus, vectors enable a dual view of the data: relational and (meaningful) text. Word embedding then may extract latent semantic information in terms of word associations and co-occurrences and encode it in word vectors. Thus, the vectors capture first inter- and intra-attribute relationships within a row (sentence) and then aggregate these relationships across the document to compute the collective semantic relationships. The encoded semantic information then may be used in querying the database. Some embodiments of the present invention integrate word embedding techniques and capabilities into traditional database systems.

FIG. 1 is a block diagram illustrating one example of an operating environment 100 in accordance with the present invention. The operating environment 100 operates as a cognitive data management system to adapt relational databases 106 containing multiple data types for use with cognitive intelligence queries in accordance with one aspect of the present invention. As depicted, cognitive intelligence queries 102 in structured query systems use a machine learning model 104 to answer structured query language (SQL) queries pertaining to structured data source(s) 106, such as in relational tables. Responses to queries are returned as structured results 108, which also may be in the form of relational tables. The machine learning model 104 may be built from the source being queried, i.e. structured data source 106, from pre-trained from external data source 110, such as WIKIPEDIA™ or from the text corpuses of 106 and text from external sources.

Figure 2:
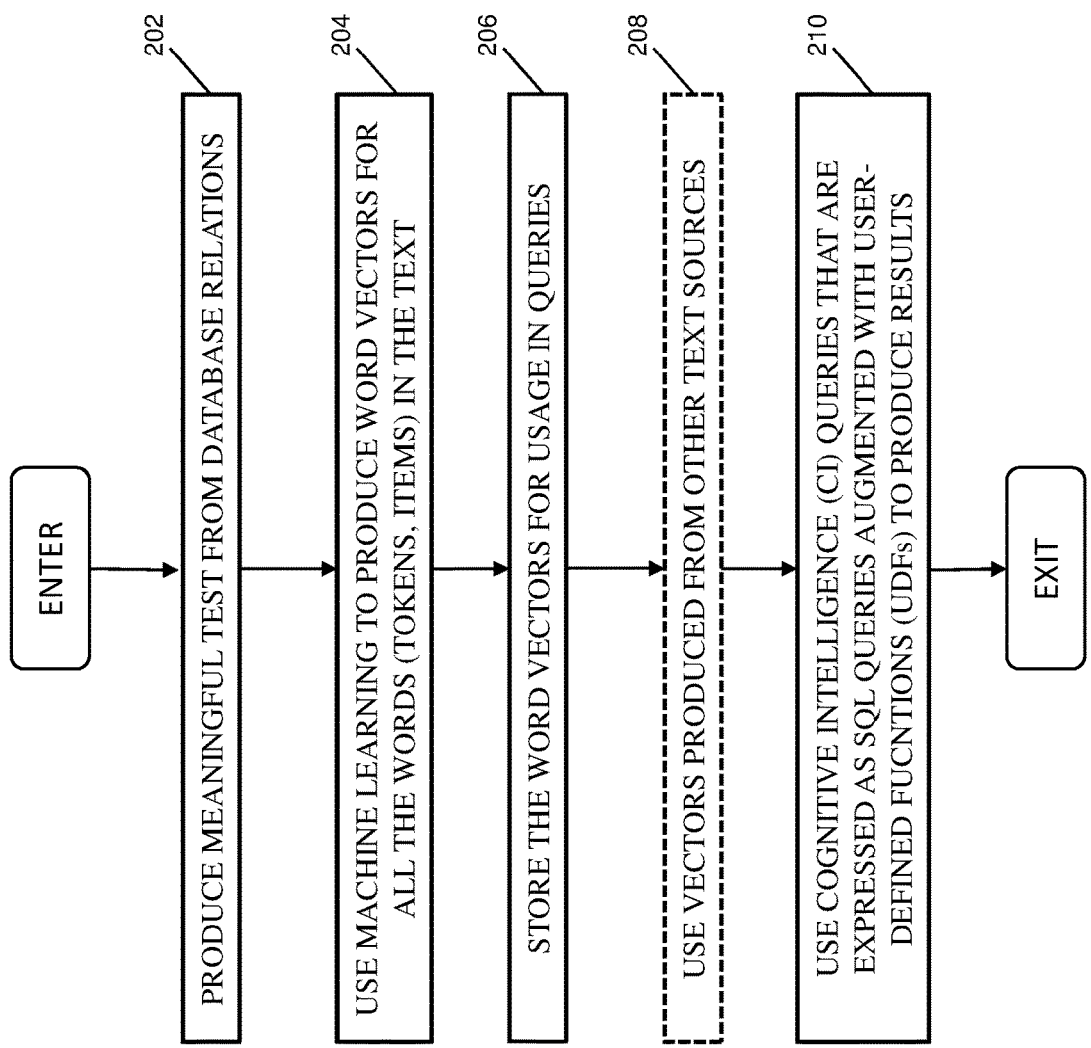
FIG. 2 depicts an exemplary process for producing word vectors from data from a relational database for use by cognitive intelligence (CI) queries according to an embodiment.
Figure 3:
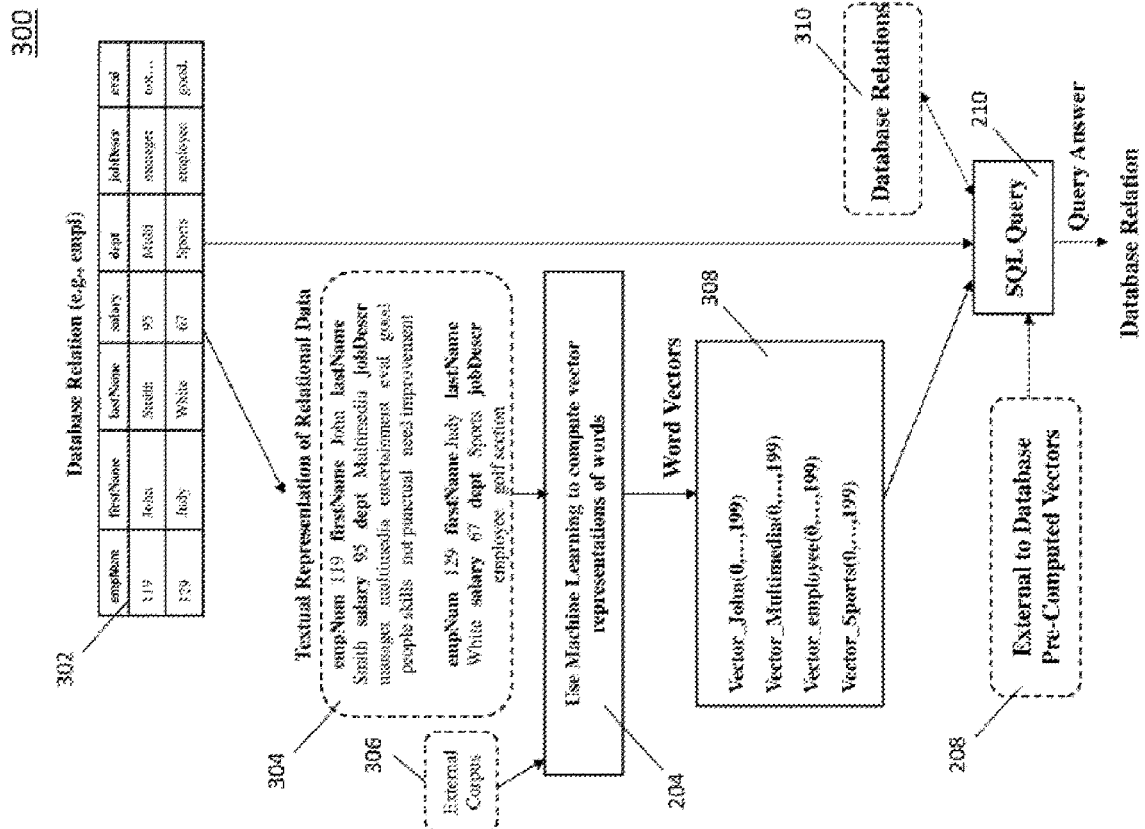
FIG. 3 depicts example states of the process of FIG. 2 in accordance with the present invention.

Exemplary steps for enhancing a system 100 with the cognitive capabilities enabled by word vectors will be described with reference to FIG. 2, which will be further described with reference to the example states of the process is shown in FIG. 3.

FIG. 2 depicts an exemplary process 200 for producing word vectors from data from a relational database for use by cognitive intelligence (CI) queries. FIG. 3, which is described in more detail below, depicts example states of the process of FIG. 2.

By way of introduction and overview (only) to the following example, it is assumed that the fields of a relational database are populated with information, e.g., relating to employees of a company (see e.g., FIG. 3, 302) and the tokens, or contents, of each field are related by placement of the rows and columns of the database. A token may be a string, a set or sequence of strings, a numeric value, an image or set of images (e.g., video), a time series, or other SQL types such as date, latitude and longitude, etc. It is further assumed (for purposes of this example only), that non-header rows contain information applicable to a specific employee, while each column contains the same type of information for every employee (see e.g., FIG. 3, 302, employee number (empNum), first name (firstName), last name (lastName), etc.)

Referring now to FIG. 2, at step 202, meaningful data is produced/extracted from database relations. Relevant information in a relational database can be determined by a view of underlying relations generated using traditional Select, Project and Join operators. The database view can be used to generate meaningful text from database tokens.

Which rows or columns are textified (i.e., made into a sequence of tokens) may be controlled by defining a view using standard relational operations. The meaning of a word (i.e. token) can be inferred from by means of its neighbors. The neighborhood context contributes to the overall meaning of the word. A meaning of a database token can be determined from other tokens in the row, the columns of a row, in turn, can be determined by the schema of its view.

For example, meaningful data can be extracted and a model created by mapping, e.g., converting a relational row to a sentence (cf FIG. 3, 302, 304). Other views may be defined such that not all the token occurrences in the database are used in building the model. One goal of a meaningful text model is to capture relationships between tokens (words, items) across and within columns.

At step 204, machine learning is used to produce word vectors for all words (tokens, items) in the text. For example, an algorithm can compute word vector representations for all words (optionally excluding header words) in the meaningful text. In some embodiments, an external source (or corpus) can also be used for model training (see e.g., FIG. 3, 306). A resulting set of low-dimensional (e.g., dimension=200) semantic representations of words, or "word vectors," can each represent one word (token). Although in this example, a "word" is used as a synonym for "token," not every token may be a valid word in a natural language sense. A token may be a string, a set or sequence of strings, a numeric value, an image or set of images (e.g., video), a time series, or other SQL types such as date, latitude and longitude, etc. The word vectors capture latent inter/intra-attribute relationships from a relational table or database and provide a unified representation of multi-modal relational data. Two words can be considered semantically similar (i.e. have similar meaning) if their word vectors are close in the vector space, based on a distance metric (e.g., cosine distance).

At step 206, the word vectors are stored for usage in queries. In some embodiments, word vectors include a vector for each token in the meaningful text. At step 208, vectors produced from other text sources (see e.g., step 204 and FIG. 3, 306) may optionally be used, solely or in conjunction with database-textified text.

At step 210, cognitive intelligence (CI) queries are used to produce database relation results. In some embodiments, CI queries can be expressed using standard SQL. Some embodiments enable CI queries using the word vectors in the vector space as user-defined functions (UDFs). Upon completion of step 210, the process exits.

FIG. 3 depicts example states 300 of the process of FIG. 2 in accordance with the present invention. As depicted, tokens in relational database 302 are converted to meaningful text sentences 304. For example, the first (non-header) row of relational database 302 can be converted to "empNum 119 firstName John lastName Smith salary 95 dept Multimedia jobDescr 'manager, multimedia, entertainment' eval 'good people skills, not punctual, need improvement'". The meaningful text sentences 304, along with any optional external corpus 306, are then converted to word vectors 308 using machine learning 104. The resulting word vectors 308, such as Vector_John(0, . . . , 199), Vector_Multimedia (0, . . . , 199), etc., may be referred to as the "word embedding model" and can be used by an augmented SQL query 210 targeted toward relational databases 310 and provide enhanced results not previously obtainable using traditional SQL queries. In some embodiments, the augmented SQL query 210 can reflect one or more collections of pre-computed vectors 208, e.g., from external databases.

Figure 4:
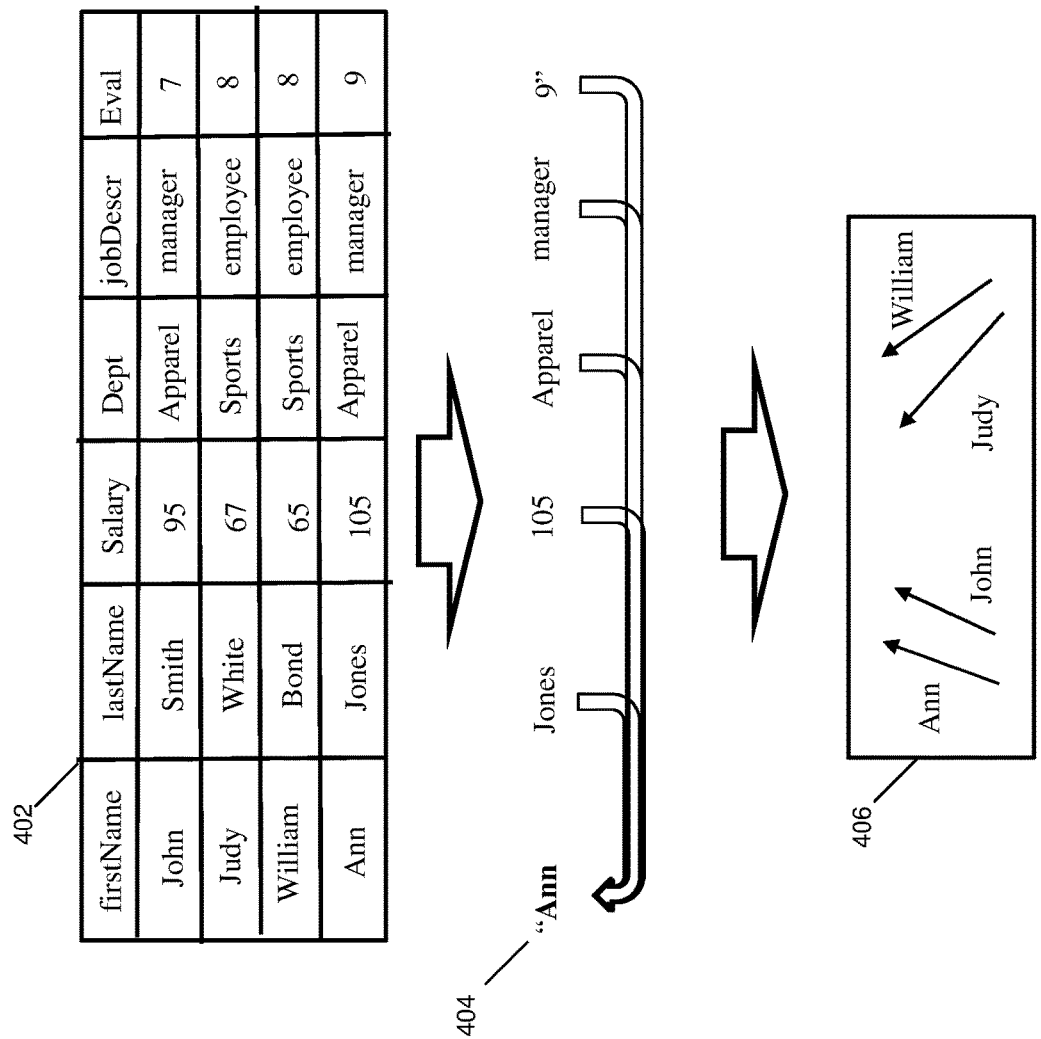
FIG. 4 depicts an example employee analytics query of a word embedding model based on a relational database in accordance with embodiments of the present invention.

FIG. 4 depicts an example query of a word embedding model derived from an example relational database 402 of employee data. In 4, the view (i.e., the data translated to be fed into the model generation engine) generated produces text containing all of the non-header token occurrences in the database 402. Thus, a vector is created for each token. A query to identify similar employees based on first names would examine the word vectors for each customer's first name (i.e. John, Judy, William, Ann). So, for Ann, the relevant row (tuple) 404 would be "Ann Jones 105 Apparel manager 9". In the vector space, the word vector of Ann is more similar to the word vector of John as both are in the Apparel department and are both managers. Likewise, the word vector of Judy is more similar to the word vector of William as both are in the Sports department, are employees and have evaluation ratings of 8.

Figure 5:
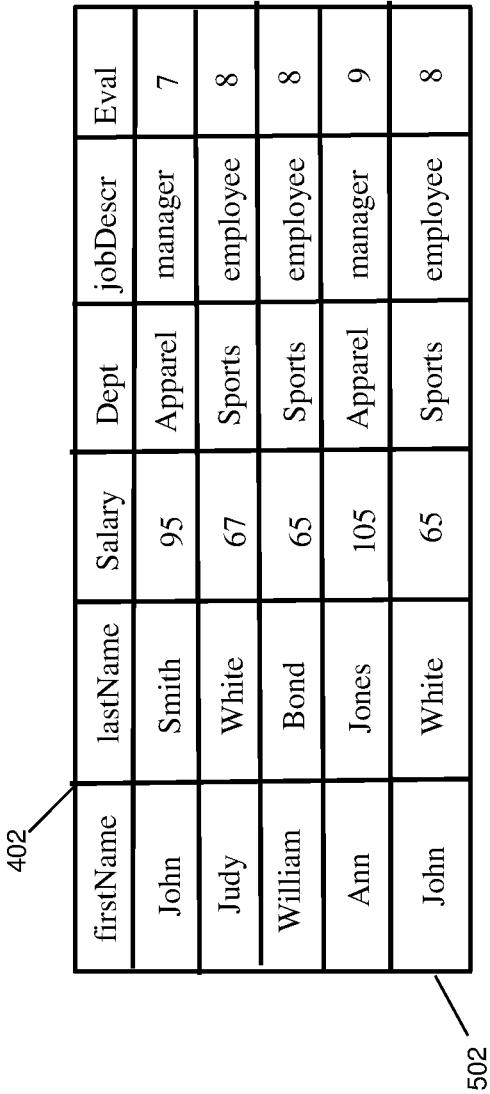
FIG. 5 depicts an example addition of data to the relational database of FIG. 4 in accordance with embodiments of the present invention.

However, in many real life applications, relational databases that serve as the source data for a word embedding model may routinely be augmented with additional data. For example, FIG. 5 depicts an example addition of a new row 502 representing a new employee, John White, to the relational database 402 of employee data. In order to account for new data added to the relational database 402 (i.e., the new employee data) in the word embedding model, conventional methods would typically require the word embedding model to be entirely retrained in a manner previously described above with respect to FIGS. 1-3. However, FIG. 6 depicts an exemplary method for updating the word embedding model to account for the newly added row 502 of the relational database 402 without the need to entirely retrain the model.

Figure 6:
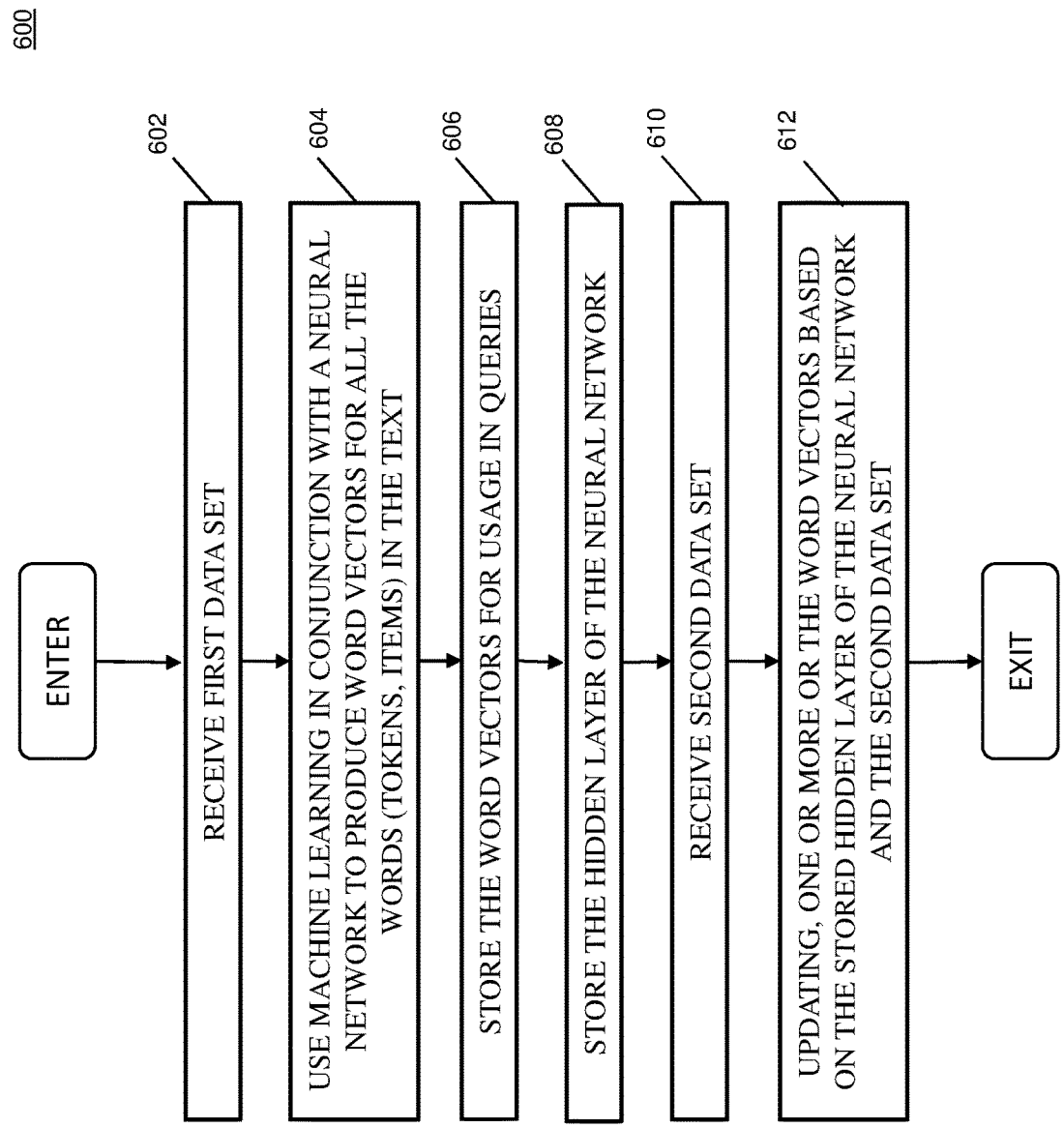
FIG. 6 depicts an example method of updating a word embedding model according to an embodiment.

FIG. 6 depicts a flow diagram of a method 600 for an example method of updating a word embedding model according to one or more embodiments of the invention. Embodiments of method 600 may be executed by the processing system described in greater detail below with respect to FIG. 11, and may incorporate some or all of the methods and techniques to generate and query a word embedding model described above with respect to FIGS. 1-4. The method 600 begins at block 602 and includes receiving a first data set comprising a relational database having a plurality of words. The relational database may comprise a table including rows and columns, as shown by for example, example relational database 402 shown in FIG. 4.

Next, as shown at block 604, the method 600 includes generating a word embedding model comprising a plurality of word vectors. Each word vector of the plurality of word vectors corresponds to a unique word (i.e., an entity) of the plurality of words, for example, as shown by word vectors 308 in FIG. 3. According to some embodiments, generation of a word embedding model may be performed based on the first data set in accordance with some or all of the steps described above with respect to FIGS. 1-3. In some embodiments, generation of a word embedding model can be performed by training a neural network using unsupervised machine learning based on the first data set.

According to embodiments of the disclosure, a word embedding model may be generated from relational database data using an unsupervised approach based on the Word2Vec (W2V) implementation. As will be appreciated by those of skill in the art, unsupervised learning does not require a correct answer associated with each input pattern in the training data set, but rather explores the underlying structure in the data, or correlations between patterns in the data, and organizes patterns into categories from these correlations. The training approach may operate on the unstructured text corpus (as shown in FIG. 3), organized as a collection of English-like sentences, separated by stop words (e.g., newline). There is no need to label the training data in an unsupervised training approach. Another advantage of unsupervised training is that users do not need to do any feature engineering, as features of the training set are extracted automatically by the training process.

Figure 7:
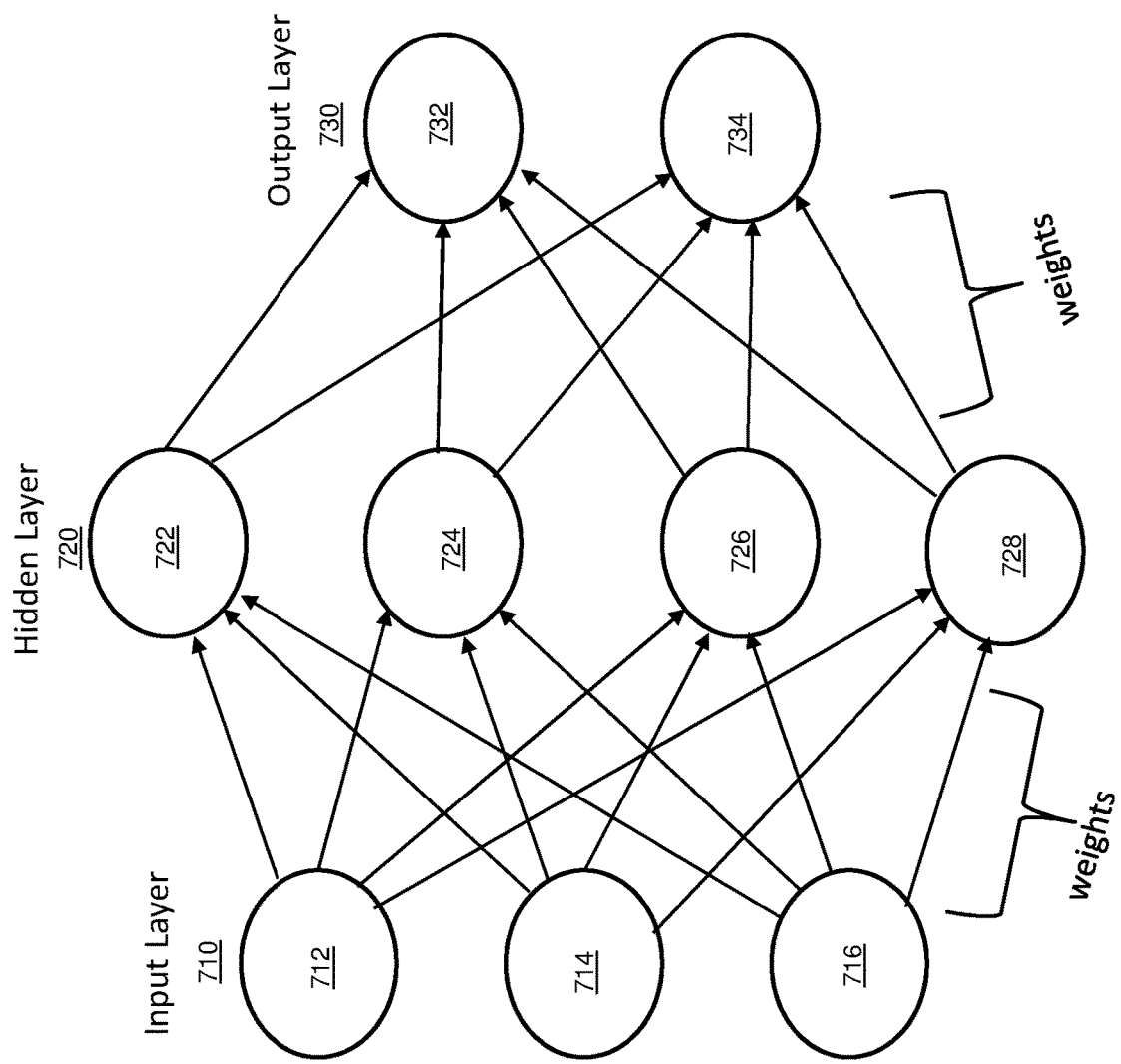
FIG. 7 depicts an example neural network architecture according to an embodiment.

During the training process, the classical W2V implementation uses a simplified 3-layer shallow neural network that views the input text corpus as a sequence of sentences. FIG. 7 depicts a simplified example of a neural network 700. Artificial neural networks (ANNs) (which may also simply be referred to as a "neural network") can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of a desired patterns, such as images and characters. Oftentimes, these neurons are grouped into "layers" in order to make connections between groups more obvious and to each computation of values. Training the neural network is a computationally intense process.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

In one or more examples, weight elements are stored in a weight storage element such as a capacitor and read by a weight reader, such as a field effect transistor (FET). Alternatively, or in addition, the weight storage elements can be digital counters (e.g. J-K flip-flop based counters), a memory storage device, or any other electronic circuit that can be used for storing the weight. Here, "weight" refers to a computational value being used during computations of an ANN as described further.

As shown in FIG. 7, a neural network 700 includes an input layer 710, a hidden layer 720, and an output layer 730. Although only one input layer, one hidden layer and one output layer are shown, in practice, an input layer will have many inputs and multiple hidden layers can be provided. The input layer 710 is made up of a plurality of inputs 712, 714, 716, the hidden layer(s) are made up of a plurality of hidden layer neurons 722, 724, 726 and 728, and the output layer is made up of a plurality of output neurons 732, 734. As shown by FIG. 7, the neurons of the various layers are interconnected by pathways (or "paths") that each have an associated weight. Prior to generating a word embedding model, the neural network is initialized by populating all of the weights with pseudo-random values. Generally speaking, each neuron of the hidden layer 720 will also have an associated "bias" value, which may be initially set to zero for each. As will be appreciated by those of skill in the art, as data is input to the neural network via the input layer 710, the data propagated along the paths shown by multiplying the value of the data by the dot product of the weight of the path and then adding the bias of the destination neuron and then passed through an activation function to convert the input signal to an output signal. Following this forward propagation through the neural network, the system performs a backward propagation to update the weight parameters of the paths and the biases of the neurons. These steps may be repeated to train the model by updating the weights and biases until a cost value is met or a predefined number of iterations are run.

For each word in a sentence, the W2V code defines a neighborhood window to compute the contributions of nearby words. Unlike deep learning based classifiers, the output of W2V is a set of vectors of real values of dimension d, one for each unique token in the training set (the vector space dimension d is independent of the token vocabulary size). According to some embodiments, a text token in a training set can represent either text, numeric, or image data. Thus, a word embedding model generated in accordance with the disclosure may build a joint latent representation that integrates information across different modalities using untyped uniform feature (or meaning) vectors.

According to some embodiments, training the neural network using unsupervised machine learning based on the first data set can include determining one or more weights and/or biases associated with one or more neurons of the hidden layer of the neural network and storing a representation of the hidden layer of the neural network comprises storing the determined one or more weights and/or biases associated with the one or more neurons of the hidden layer. In some embodiments, the neural network may include multiple hidden layers, and thus in some embodiments storing the hidden layers may include storing data (e.g., weights, biases, etc.) associated with each of the hidden layers.

Next, as shown at block 606, the method 600 includes storing the plurality of word vectors. The stored word vectors represent the word embedding model which may then be queried to determine, for example, entity similarity, dissimilarity, analogy, OLAP (Online Analytical Processing) and other such different query types.

Next, as shown at block 608, the method 600 includes storing a representation of a hidden layer of the neural network. According to some embodiments, storing a representation of the hidden layer can include storing the input values to the hidden layer, the weights and biases associated with the hidden layer, and/or the outputs of the hidden layer. According to some embodiments, if there are multiple hidden layers in the artificial neural network, storing a representation of the hidden layer can include storing the inputs, weights, biases and outputs associated with each layer (e.g., respectively associated with each neuron of a layer) of the hidden layers, where the outputs of one hidden layer may be the inputs of a next hidden layer. In some embodiments, the activation/transformation functions associated with one or more neurons of the hidden layer(s) may also be stored. The hidden layer can be stored by, for example, a memory of processing system, such as processing system 1100 shown in FIG. 11. In some embodiments, the hidden layer can be stored in memory of a distributed system or any other suitable storage location such that it may be accessed for further processing.

Next, as shown at block 610, the method 600 includes receiving a second data set. The second data set comprises data that has been added to the relational database. For example, in some embodiments, the second dataset may be a new row that has been added to the relational database or table, such as for example, new row 502 added to the example relational database 402 shown in FIG. 5.

Figure 8:
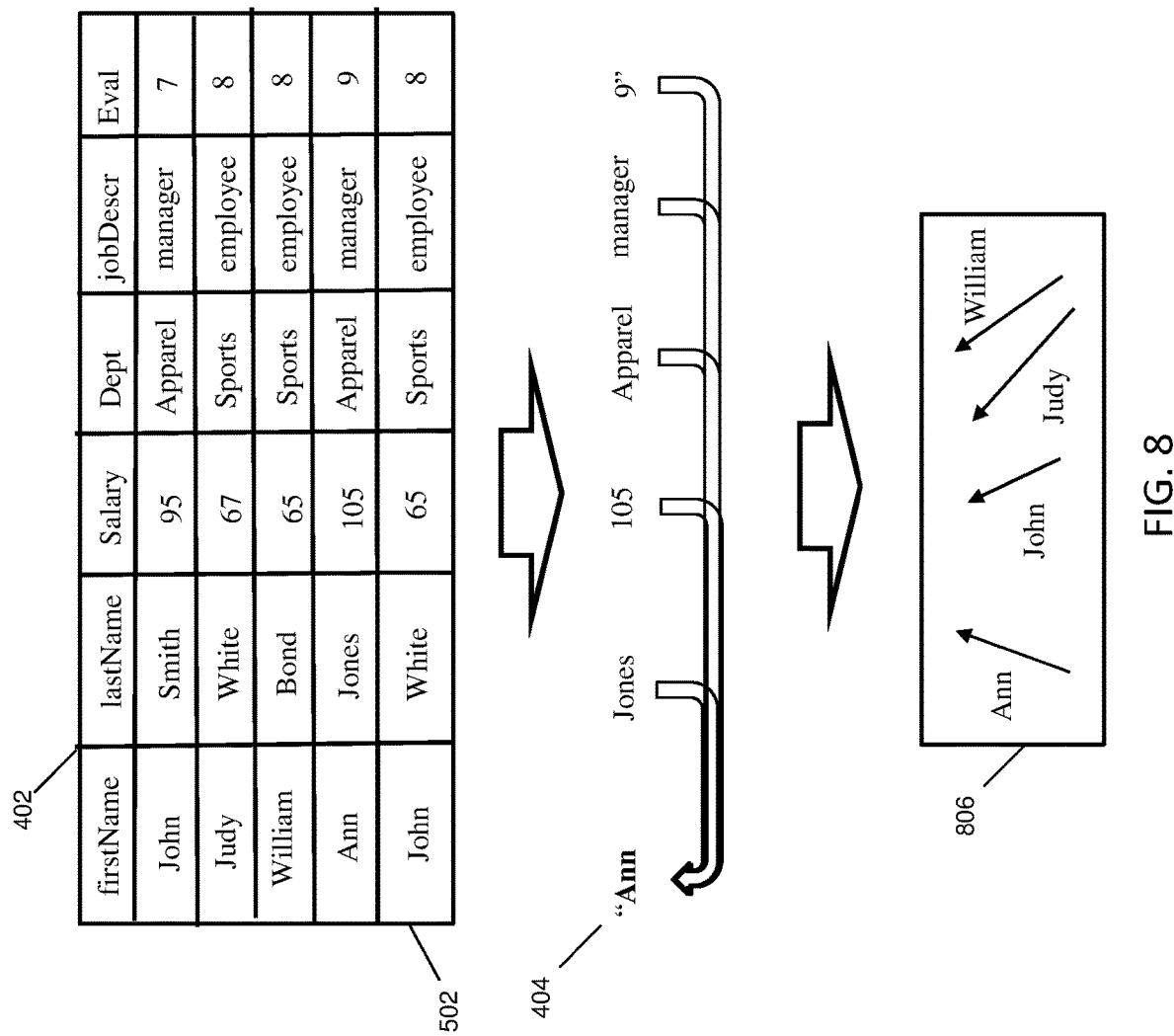
FIG. 8 depicts an example employee analytics query of an updated word embedding model based on the updated relational database of FIG. 5 in accordance with embodiments of the present invention.

Next, as shown at block 612, the method 600 includes updating the word embedding model based on the second data set and the stored representation of the hidden layer of the neural network. In some embodiments, the second data set may be a set of words and each word of the set of words can be included in the plurality of words of the relational database. In other words, in some embodiments, as shown by the example presented in FIG. 5, the new data (e.g., new 502) added to the relational database 402 may only include words and/or entities that are already present in other rows of the relational database. In such cases, updating the word embedding model based on the second data set and the stored representation of the hidden layer of the neural network can include updating a set of word vectors that corresponds to the set of words, wherein the set of word vectors is a subset of the plurality of word vectors. For example, as shown in FIG. 8, the new row 502 adds data comprising "John", "White", "65", "Sports", "employee" and "8", and so updating the word embedding model in this case would include updating at least the word vectors that correspond to "John", "White", "65", "Sports", "employee" and "8" to account for the new data added by the new row 502. As shown in FIG. 8, this incremental update the word embedding model results in different query results 806 for a query to identify similar people by their first names as compared to the initial query results 406 returned before adding the new row 502. In other words, as shown in FIG. 4, "John" was similar to "Ann" because they shared two traits in common ("Apparel" and "manager") and no traits in common with Judy or William. However, after adding the new row 502, the new entry of "John" has the last name of "White" in common with "Judy", a salary of "65" in common with William and "Sports" and "Apparel" in common with both July and William, yielding new query results 806 that show that "John" is now more similar to "Judy" and "William" than to "Ann". Because the system is only incrementally adding this one line of new data 502, the word vectors for words that don't include the words of the new data remain largely unaffected. For example, as shown in the query results of FIG. 8, the word vector for Ann remains largely unchanged because the entry for Ann (i.e., "Ann", "Jones", "105", "Apparel", "manager" "9") does not include any of the words added by the new data 502 ("John", "White", "65", "Sports", "employee", "8"), and thus the portions of the hidden layer involving these words contained in the Ann entry are generally unaffected by the addition of the new data 502 to the neural network, as the old data will generally only be affected it has some relationship with the new data.

Figure 9:
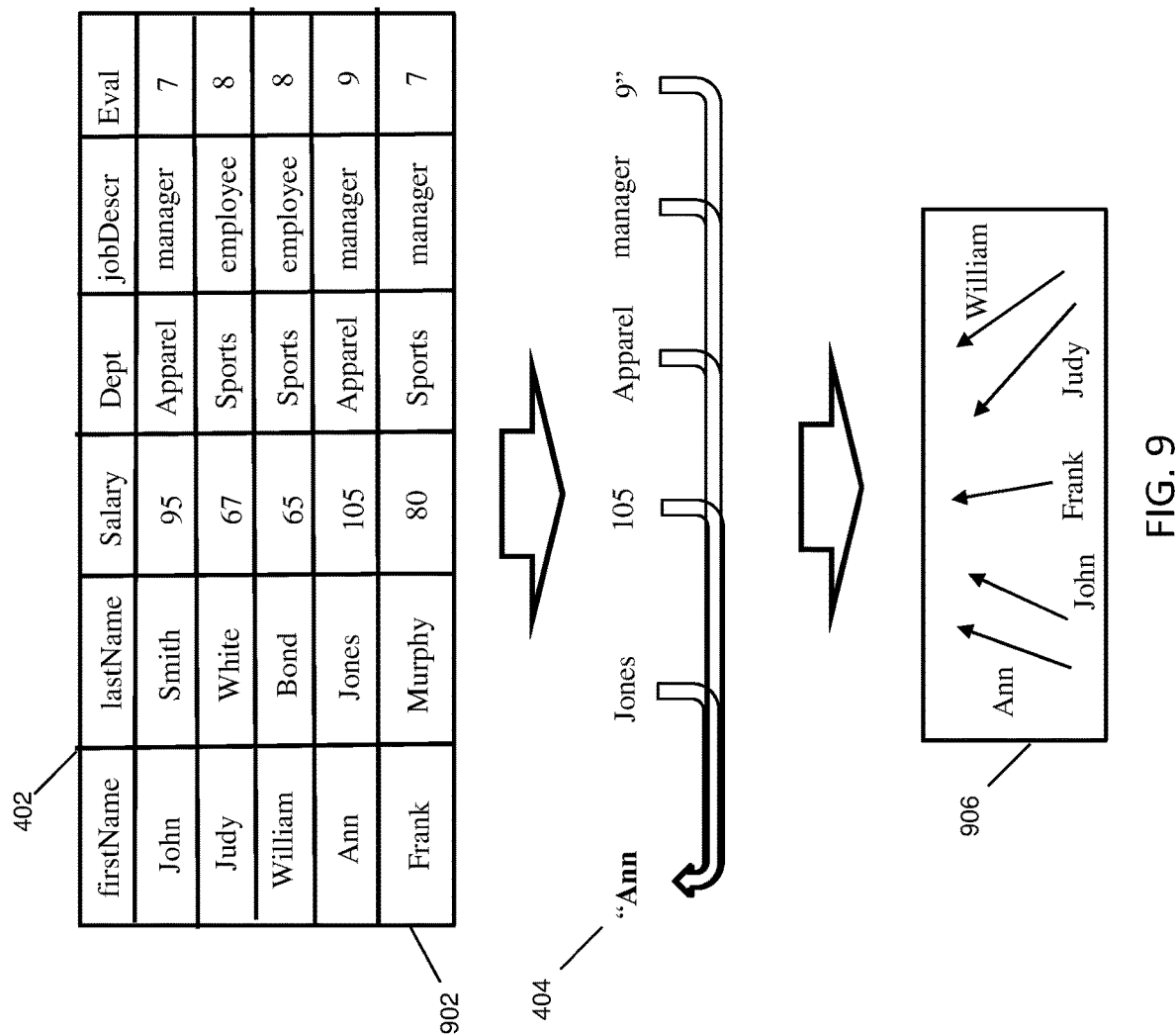
FIG. 9 depicts an example employee analytics query of an updated word embedding model based on a relational database that has been updated to include a new word.

According to some embodiments, the second data set may include a set of words and one or more new words, wherein the one or more new words are words that are not included in the plurality of words of the relational database. For example, as shown in FIG. 9, a new row 902 of data may include words that were not previously included in the relational database 402 (i.e., "Frank", "Murphy", and "80"). In such cases, updating the word embedding model based on the second data set and the stored representation of the hidden layer of the neural network can include updating a set of word vectors that corresponds to the set of words in a manner similar to that described previously above and also generating one or more new word vectors that correspond to the one or more new words. The set of word vectors is a subset of the plurality of word vectors. For example, in the example embodiment shown in FIG. 9, updating the word embedding model would include generating a new word vectors for "Frank," "Murphy," and "80," while the previous word vectors for "Sports", "manager" and "7" would be updated as described above. Thus, as shown in FIG. 9, a word embedding model that has been updated with a new row 902 of data including the "Frank" word would generate query results 906 providing the newly added "Frank" word vector in response to a query requesting similarity of entities by firstName. Such new word vectors may be generated by saving the complete state of the neural network following the generation of the initial model and then adding the new data as inputs to further train the saved neural network. For example, in response to receiving the new data, the system may load the stored representation of the hidden layer(s) of the neural network and may incrementally train the neural network with the new input data to generate the new word vector(s). As described above, the stored representation of hidden layer(s) of the neural network can include the transformation functions, weights, biases, and outputs associated with the respective neurons of the hidden layer(s). In some embodiments, the neural network may only include a single hidden layer, whereas in other embodiments the neural network may include multiple hidden layers. In a case where the neural network includes multiple hidden layers, the system may also store intermediate values that are calculated to facilitate the updating of weights and biases. According to some embodiments, the system may ensure that newly added vocabulary has similar weight to existing vocabulary to create proper relevance. For example, the system may execute an internal loop to generate a new word vector of appropriate weighting. In other words, starting with the existing word vectors, the neural network may be exercised multiple times to allow the weights and biases to propagate through the network until a cost target is reached. In some embodiments, if newly added data represents a new numeric value that is out of existing bounds of existing data clusters, the system may be configured to re-cluster the data as appropriate by for example, creating new clusters that include the newly added out of bounds data. In some embodiments, the system may provide images support using image characteristics and features by representing each image by a set of common attributes. For example, with respect to an image, the size, colors, color placement, and attributes of the image (e.g., number of legs of a horse shown in the image is four and for a human is two) may be converted to text. In some embodiments, the system may be configured to be used in multi-mode to combine image features and relational data, as once images are represented by attributes they may be treated like any other relational data. Some embodiments of the present disclosure may also include generating a log during initial training and incremental training (i.e., updating) of the neural network that may indicate how the model was generated. In some embodiments, the log may store the original parameters used to generate an initial word embedding model, which may be accessed and used for performing an update using the same parameters. In some embodiments, the log may store values representative of the state of the hidden layer(s) of the neural network (e.g., inputs, weights, biases, outputs, transformation functions, etc.).

According to some embodiments, updating the word embedding model comprises updating a portion of the neural network based on the second data set. For example, in some embodiments a new neural network may be built based on the new data and the saved hidden layer(s) of the initial/previous neural network used to generate the initial/previous word embedding model. If new words are present in the new data, more nodes are added to the input layer of the neural network. The new neural network with the new words (if any) can be trained repeatedly and one or more word vectors are updated to reflect inclusion of the new data in the model. In some embodiments, the portion of the neural network may be a relatively small portion of the entire neural network. For example, in some embodiments, updating a portion of the neural network based on the second data set can include updating the hidden layer of the neural network to adjust weights and/or biases associated with neurons of the hidden layer based on the second data set. The method can include storing a representation of the updated hidden layer. This process can be performed iteratively so that every time a new set of data is added to the relational database, the relevant portion of the word embedding model (i.e., the word vectors including words overlapping with words of the new data and any other word vectors that are tangentially affected by changes to the hidden layer of the neural network) are updated as described above, and the updated hidden layer of the neural network is saved as the starting point for the next update upon receiving yet another new set of data to the relational database. In this manner, the word embedding model can be interactively and incrementally updated to incorporate new data added to the relational database without having to retrain the model with all of the data of the updated relational database, thus saving large amounts of processing resources and computational time.

In some embodiments, generating the word embedding model based on the first data set may include applying selected parameters to the first data set and/or the training the neural network, such as for example, preprocessing applied to the data of the relational database or hyperparameters used in the generation of the word embedding model. Selected parameters may include but are not limited to, for example, a selection of columns of the relational database for inclusion in generation of the word embedding model, a selection of algorithms for determining relationships between words (e.g., bag of words, skip gram, etc.), the number of iterations, debugging parameters, window of analysis parameters (e.g., words before and after a given word) and other such parameters used in word embedding model generation. Preprocessing parameters may include for example, transforming data (e.g., transforming images, numbers, and/or other data formats to text) to a common format for comparison and clustering methods applied to the data of the relational database. For example, the category of "Salary" shown in relational database 402 of FIG. 4 may have significant relevance, but because the likelihood of two salaries matching (and thus being treated as the same entity) is low, it may be useful to cluster the data and reformat the salary entries in the relational database before the data is feed into the neural network to train the word embedding model. The salaries may be clustered by placing them into "buckets." For example, salaries of 0 to 50 could be considered to be "low salary," salaries of 50 to 80 may be considered to be "moderate salaries," and salaries of above 80 may be considered to be "high salaries." Thus, clustering may be applied to the "Salary" column of the relational database 402 of FIG. 4 to replace the Salary values for Judy and William with "moderate" and for John and Ann with "high" to generate a more meaningful relationship between the data. Data transformations may also include header concatenation with values (e.g., hair_brown, eyes_brown).

Hyperparameters can be parameters specified by a designer that impact aspects of the neural network training, such as for example, the number of layers, the size of each layer, the number of connections, how many iterations are used to generate the model, which algorithms are applied to determine relationships between words, debugging parameters, subsampling, window size, and the like. Generally, it is beneficial to perform an update to the word embedding model using the same preprocessing methods, parameters and/or hyperparameters used to generate the original model. Accordingly, in some embodiments, the method may include storing the preprocessing methods, parameters and/or hyperparameters used to generate the word embedding model based on the first data set and applying the stored preprocessing methods, parameters and/or hyperparameters to the new data (e.g., the second data set) and/or the incremental training of the neural network as applicable.

Figure 10:
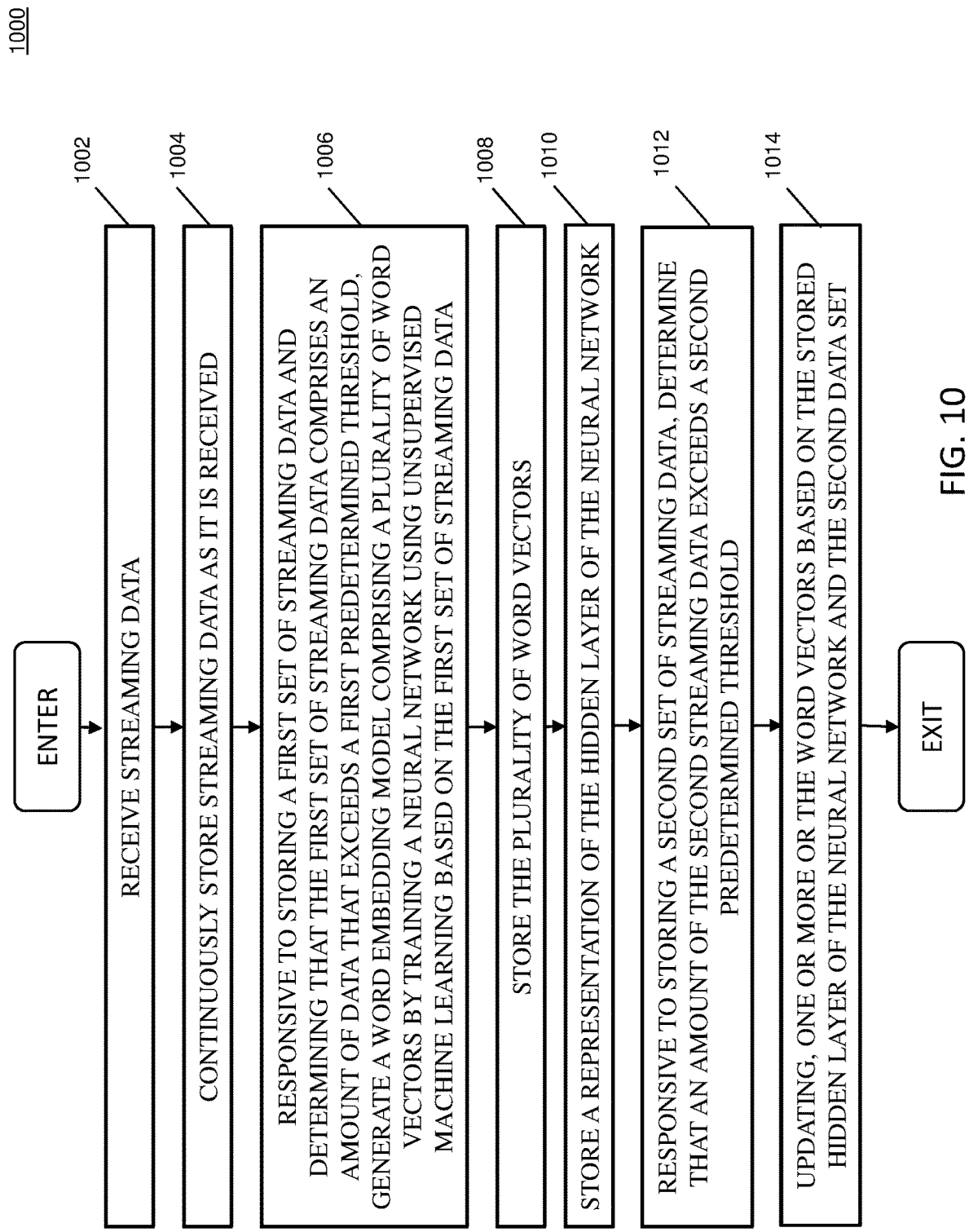
FIG. 10 depicts an example method of updating a word embedding model based on streaming data according to an embodiment.

FIG. 10 depicts a flow diagram of a method 1000 for an example method of updating a word embedding model according to one or more embodiments of the invention. Embodiments of method 1000 may be executed by the processing system described in greater detail below with respect to FIG. 11 and may incorporate some or all of the methods and techniques to generate and query a word embedding model described above with respect to FIGS. 1-4. The method 1000 begins at block 1002 and includes receiving streaming data. According to some embodiments, the system may receive streaming data from any data source in which such live data can be converted for incremental training of the word embedding model. In some embodiments, examples of streaming data received from the system can include event data from web or mobile applications, sensors, medical devices, transaction data, social media data (e.g., comments on social media posts or online news articles), stock market data, ecommerce data, audio data, video data or any other type of streaming data that may be useful to create a query-able word embedding model. For example, in some embodiments, streaming data may include bank transaction information (withdrawals, deposits, transfers, payments, purchase authorizations, etc.) that can be used to build a word embedding model that can be queried to identify purchase behavior similarity between customers.

Next, as shown at block 1004, the method 1000 includes continuously storing the streaming data as it is received. For example, streaming data may be stored in a relational database as it is received. According to some embodiments, the streaming data may be converted and stored in a format for use in creating and/or updating a word embedding model. In some embodiments, streaming data can be stored as structured data in, for example, a relational database. In some embodiments, data can be stored as unstructured data (e.g., social media text).

Next, as shown at block 1006, the method 1000 includes, in response to storing a first set of streaming data and determining that the first set of streaming data comprises an amount of data that exceeds a first predetermined threshold, generating a word embedding model comprising a plurality of word vectors. Each word vector of the plurality of word vectors may correspond to a unique word of the plurality of words. The word embedding model can be generated by training a neural network using unsupervised machine learning based on the first set of streaming data, in a manner similar to that previously described above. According to some embodiments, a first predetermined threshold can represent a minimum amount of data specified for creating an initial word embedding model. In other words, a designer of the system may determine that a minimum amount of data is needed before an initial model may have any value, so the system may simply acquire and store streaming data until it reaches the threshold, at which point the system may then generate an initial word embedding model based on the first set of streaming data.

According to some embodiments, training the neural network using unsupervised machine learning based on the first data set of streaming data may include determining one or more weights and/or biases associated with one or more neurons of the hidden layer of the neural network.

Next, as shown at blocks 1008 and 1010, the method 1000 includes storing the plurality of word vectors and storing a representation of a hidden layer of the neural network. The word vectors and representation of the hidden layer of the neural network may be stored in a manner similar to that described previously above. In some embodiments, storing a representation of the hidden layer of the neural network may include storing the one or more weights and/or biases associated with the one or more neurons of the hidden layer that are determined during the training of the neural network or that are updated during an incremental update of the neural network.

Next, as shown at block 1012, the method 1000 includes in response to storing a second set of streaming data, determining that an amount of the second set of streaming data exceeds a second predetermined threshold. The second set of streaming data may be streaming data that is received chronologically after the first set of streaming data. For example, in some embodiments, after the system has stored enough streaming data for the first set of streaming data to serve as the basis for the word embedding model, the subsequently received and stored streaming data may be viewed as the second set of streaming data to the point that the size or amount of data of the second set of data exceeds a second threshold. According to some embodiments, the second threshold may be considerably smaller than the first threshold, as the second threshold may serve as a cut-off to perform an incremental update of the previously trained word embedding model and may thus require significantly less data in order for the updated model to yield meaningful results.

Next, as shown at block 1014, the method 1000 includes updating, based on the second set of streaming data and the stored representation of the hidden layer of the neural network, the word embedding model to create a first updated word embedding model. In some embodiments, updating the word embedding model may be performed in accordance with some or all of the method 600 described above with respect to FIG. 6.

According to some embodiments, updating the word embedding model to create a first updated word embedding model can include updating a portion of the neural network to adjust weights and/or biases associated with neurons of the hidden layer based on the second set of streaming data. Generally, updating a portion of the neural network may include updating data (e.g., inputs, outputs, weights, biases, etc.) associated with less than all of the neurons of the hidden layer. In other words, in some embodiments, the system may update only a fraction of the hidden layer to account for the impact of the newly added data on the model. In some cases, for example, if the newly added data is very large, it may be necessary to update the entire neural network. According to some embodiments, the system may update the entire neural network in response to detecting an anomaly in the newly added data, such as for example the system determining that clustering has become meaningless in view of the newly added data (e.g., because a large percentage of the data appears in the same cluster). In some embodiments, the method 1000 may further include storing a representation of an updated hidden layer, responsive to storing a third set of streaming data, determining that an amount of the third set of streaming data exceeds the second predetermined threshold, and updating, based on the third set of streaming data and the stored representation of the updated hidden layer of the neural network, the first updated word embedding model to create a second updated word embedding model. The third set of streaming data may be streaming data that is received chronologically after the second set of streaming data. In this way, the word embedding model can be iteratively updated with each new set of data (e.g., as determined by sequential data sets exceeding or meeting the second predetermined threshold) to allow the system to continually update the word embedding model as more and more streaming data is received. Such continuous updating in real time would be impossible with conventional methods of adding new relational data to a word embedding model because it would require a very long time to retrain the word embedding model from the start (e.g., hours or days) whereas the techniques for updating the word embedding model disclosed herein may allow the word embedding model to be updated in a matter of second or minutes.

Accordingly, using the techniques described herein, a user may be given the capability to query the word embedding model and receive results that incorporate recent streaming data. Thus, in some embodiments the method 1000 may further include responsive to receiving a query of the word embedding model during streaming of the streaming data and before updating the word embedding model to create the first updated word embedding model, generating results of the query based on the word embedding model, responsive to receiving a query of the word embedding model during streaming of the streaming data, after updating the word embedding model to create a first updated word embedding model and before updating the word embedding model to create the second updated word embedding model, generating results of the query based on the first updated word embedding model, and responsive to receiving a query of the word embedding model during streaming of the streaming data and after updating the word embedding model to create the second updated word embedding model, generating results of the query based on the second updated word embedding model. Thus, due to the iteratively updating nature of the word embedding model based on the continuously received streaming data, a user may receive near up-to-date results to queries at any time the word embedding model is queried during streaming of the data.

Additional processes may also be included. It should be understood that the processes depicted in FIGS. 2, 6 and 10 represent illustrations, and that other processes may be added or existing processes may be removed, modified, or rearranged without departing from the scope and spirit of the present disclosure.

Figure 11:
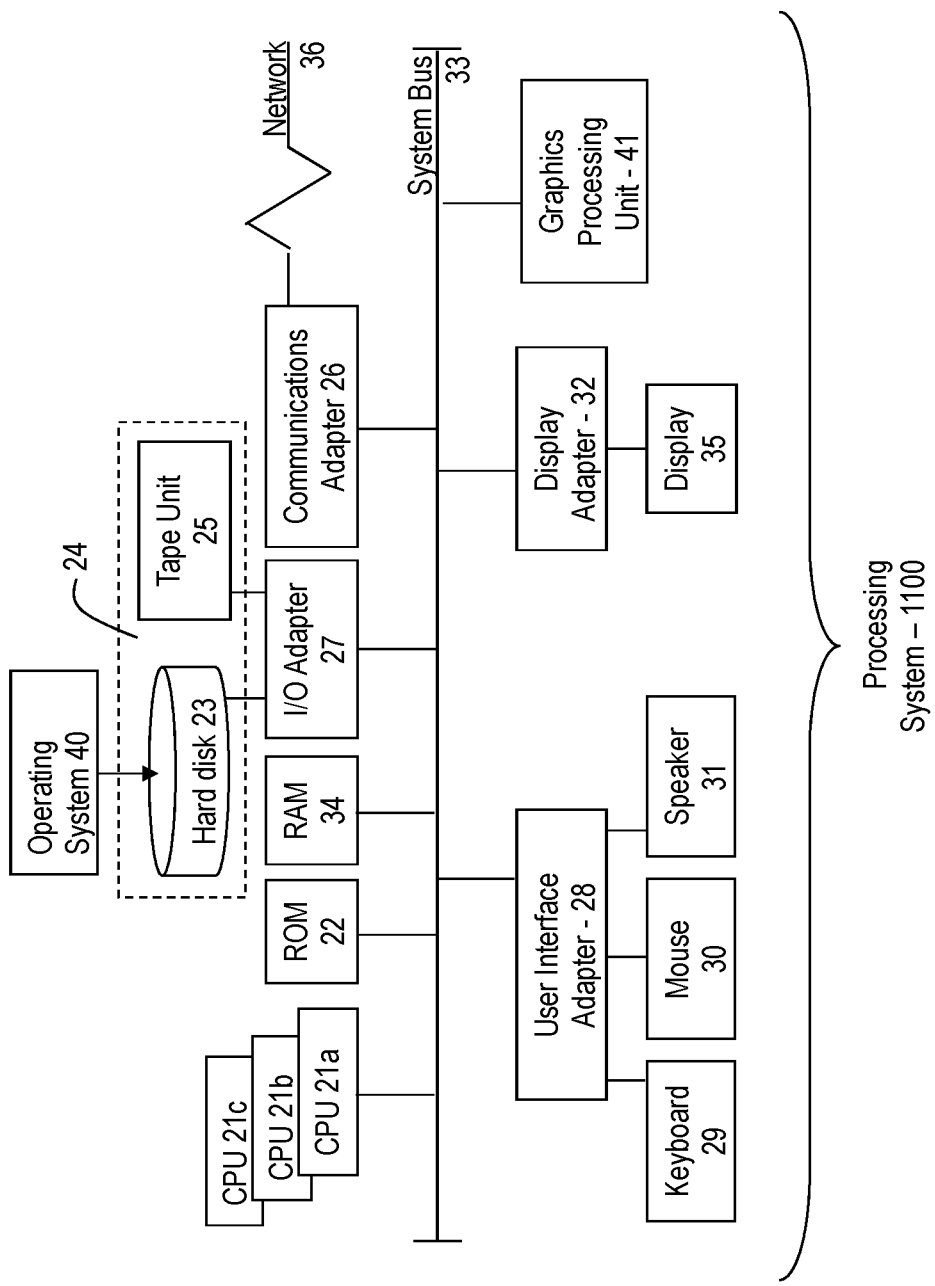
FIG. 11 depicts a block diagram of a computer system for use in implementing one or more embodiments of the present invention.

Referring to FIG. 11, there is shown an embodiment of a processing system 1100 for implementing the teachings herein. In this embodiment, the system 1100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 1100.

FIG. 11 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 1100 may be stored in mass storage 24. A network adapter 26 interconnects bus 33 with an outside network 36 enabling data processing system 1100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 1100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 11, the system 1100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 11.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a first data set comprising a relational database having a plurality of words;
   generating, by training a neural network using unsupervised machine learning based on the first data set, a word embedding model comprising a plurality of word vectors, each word vector of the plurality of word vectors corresponding to a unique word of the plurality of words;
   storing the plurality of word vectors;
   storing a representation of a hidden layer of the neural network;
   receiving a second data set, wherein the second data set comprises data that has been added to the relational database; and
   updating, based on the second data set and the stored representation of the hidden layer of the neural network, the word embedding model.

2. The computer-implemented method of claim 1, wherein the relational database comprises a table comprising rows and columns and the second data set comprises a new row that has been added to the table.

3. The computer-implemented method of claim 1, wherein training the neural network using unsupervised machine learning based on the first data set comprises determining one or more weights and biases associated with one or more neurons of the hidden layer of the neural network and storing a representation of the hidden layer of the neural network comprises storing the determined one or more weights and biases associated with the one or more neurons of the hidden layer.

4. The computer-implemented method of claim 1, wherein the second data set comprises a set of words and each word of the set of words is included in the plurality of words of the relational database, and updating the word embedding model based on the second data set and the stored representation of the hidden layer of the neural network comprises updating a set of word vectors that corresponds to the set of words, wherein the set of word vectors is a subset of the plurality of word vectors.

5. The computer-implemented method of claim 1, wherein the second data set comprises a set of words and one or more new words, wherein the one or more new words are not included in the plurality of words of the relational database, and updating the word embedding model based on the second data set and the stored representation of the hidden layer of the neural network comprises updating a set of word vectors that corresponds to the set of words and generating one or more new word vectors that correspond to the one or more new words, wherein the set of word vectors is a subset of the plurality of word vectors.

6. The computer-implemented method of claim 1, wherein updating the word embedding model comprises updating a portion of the neural network based on the second data set.

7. The computer-implemented method of claim 6, wherein updating a portion of the neural network based on the second data set comprises updating the hidden layer to adjust weights and biases associated with neurons of the hidden layer based on the second data set, the method further comprising storing a representation of the updated hidden layer.

8. The computer-implemented method of claim 1, wherein:
   generating the word embedding model based on the first data set comprises applying selected parameters to the first data set and a training of the neural network; and
   updating the word embedding model based on the second data set comprises applying the selected parameters to the second data set and an incremental training of the neural network.

9. A system comprising:
   a processor communicatively coupled to a memory, the processor configured to:
   receive a first data set comprising a relational database having a plurality of words;
   generate, by training a neural network using unsupervised machine learning based on the first data set, a word embedding model comprising a plurality of word vectors, each word vector of the plurality of word vectors corresponding to a unique word of the plurality of words;
   store the plurality of word vectors;
   store a representation of a hidden layer of the neural network;
   receive a second data set, wherein the second data set comprises data that has been added to the relational database; and
   update, based on the second data set and the stored representation of the hidden layer of the neural network, the word embedding model.

10. The system of claim 9, wherein training the neural network using unsupervised machine learning based on the first data set comprises determining one or more weights and biases associated with one or more neurons of the hidden layer of the neural network and storing a representation of the hidden layer of the neural network comprises storing the determined one or more weights and biases associated with the one or more neurons of the hidden layer.

11. The system of claim 9, wherein the second data set comprises a set of words and each word of the set of words is included in the plurality of words of the relational database, and updating the word embedding model based on the second data set and the stored representation of the hidden layer of the neural network comprises updating a set of word vectors that corresponds to the set of words, wherein the set of word vectors is a subset of the plurality of word vectors.

12. The system of claim 9, wherein the second data set comprises a set of words and one or more new words, wherein the one or more new words are not included in the plurality of words of the relational database, and updating the word embedding model based on the second data set and the stored representation of the hidden layer of the neural network comprises updating a set of word vectors that corresponds to the set of words and generating one or more new word vectors that correspond to the one or more new words, wherein the set of word vectors is a subset of the plurality of word vectors.

13. A computer program product comprising a computer readable storage medium having program instructions embodied therewith the program instructions executable by a computer processor to cause the computer processor to perform a method comprising:
   receiving a first data set comprising a relational database having a plurality of words;
   generating, by training a neural network using unsupervised machine learning based on the first data set, a word embedding model comprising a plurality of word vectors, each word vector of the plurality of word vectors corresponding to a unique word of the plurality of words;
   storing the plurality of word vectors;
   storing a representation of a hidden layer of the neural network;
   receiving a second data set, wherein the second data set comprises data that has been added to the relational database; and
   updating, based on the second data set and the stored representation of the hidden layer of the neural network, the word embedding model.

14. The computer program product of claim 13, wherein training the neural network using unsupervised machine learning based on the first data set comprises determining one or more weights and biases associated with one or more neurons of the hidden layer of the neural network and storing a representation of the hidden layer of the neural network comprises storing the determined one or more weights and biases associated with the one or more neurons of the hidden layer.

15. The computer program product of claim 13, wherein the second data set comprises a set of words and each word of the set of words is included in the plurality of words of the relational database, and updating the word embedding model based on the second data set and the stored representation of the hidden layer of the neural network comprises updating a set of word vectors that corresponds to the set of words, wherein the set of word vectors is a subset of the plurality of word vectors.

16. The computer program product of claim 13, wherein the second data set comprises a set of words and one or more new words, wherein the one or more new words are not included in the plurality of words of the relational database, and updating the word embedding model based on the second data set and the stored representation of the hidden layer of the neural network comprises updating a set of word vectors that corresponds to the set of words and generating one or more new word vectors that correspond to the one or more new words, wherein the set of word vectors is a subset of the plurality of word vectors.

17. The computer program product of claim 13, wherein updating the word embedding model comprises updating a portion of the neural network based on the second data set.

18. A computer-implemented method comprising:
receiving streaming data;
continuously storing the streaming data as it is received;
responsive to storing a first set of streaming data and determining that the first set of streaming data comprises an amount of data that exceeds a first predetermined threshold, generating, by training a neural network using unsupervised machine learning based on the first set of streaming data, a word embedding model comprising a plurality of word vectors, each word vector of the plurality of word vectors corresponding to a unique word of the plurality of words;
storing the plurality of word vectors;
storing a representation of a hidden layer of the neural network;
responsive to storing a second set of streaming data, determining that an amount of the second set of streaming data exceeds a second predetermined threshold, wherein the second set of streaming data is received chronologically after the first set of streaming data; and
updating, based on the second set of streaming data and the stored representation of the hidden layer of the neural network, the word embedding model to create a first updated word embedding model.

19. The computer-implemented method of claim 18, wherein:
training the neural network using unsupervised machine learning based on the first set of streaming data comprises determining one or more weights and biases associated with one or more neurons of the hidden layer of the neural network; and
storing a representation of the hidden layer of the neural network comprises storing the determined one or more weights and biases associated with the one or more neurons of the hidden layer.

20. The computer-implemented method of claim 18, wherein updating the word embedding model to create a first updated word embedding model comprises incrementally training the neural network based on the second set of streaming data and the stored representation of the hidden layer of the neural network to adjust one or more weights and biases associated with one or more neurons of the hidden layer of the neural network.

21. The computer-implemented method of claim 18, wherein updating the word embedding model to create a first updated word embedding model comprises updating a portion of the neural network to adjust weights and biases associated with neurons of the hidden layer based on the second set of streaming data and the method further comprises:
storing a representation of an updated hidden layer;
responsive to storing a third set of streaming data, determining that an amount of the third set of streaming data exceeds the second predetermined threshold, wherein the third set of streaming data is received chronologically after the second set of streaming data; and
updating, based on the third set of streaming data and the stored representation of the updated hidden layer of the neural network, the first updated word embedding model to create a second updated word embedding model.

22. The computer-implemented method of claim 21, further comprising:
responsive to receiving a query of the word embedding model during streaming of the streaming data and before updating the word embedding model to create the first updated word embedding model, generating results of the query based on the word embedding model;
responsive to receiving a query of the word embedding model during streaming of the streaming data, after updating the word embedding model to create a first updated word embedding model and before updating the word embedding model to create the second updated word embedding model, generating results of the query based on the first updated word embedding model; and
responsive to receiving a query of the word embedding model during streaming of the streaming data and after updating the word embedding model to create the second updated word embedding model, generating results of the query based on the second updated word embedding model.

23. A system comprising:
a processor communicatively coupled to a memory, the processor configured to:
receive streaming data;
continuously store the streaming data as it is received;
responsive to storing a first set of streaming data and determining that the first set of streaming data comprises an amount of data that exceeds a first predetermined threshold, generate, by training a neural network using unsupervised machine learning based on the first set of streaming data, a word embedding model comprising a plurality of word vectors, each word vector of the plurality of word vectors corresponding to a unique word of the plurality of words;
store the plurality of word vectors;
store a representation of a hidden layer of the neural network;
responsive to storing a second set of streaming data, determine that an amount of the second set of streaming data exceeds a second predetermined threshold, wherein the second set of streaming data is received chronologically after the first set of streaming data; and
update, based on the second set of streaming data and the stored representation of the hidden layer of the neural network, the word embedding model to create a first updated word embedding model.

24. The system of claim 23, wherein updating the word embedding model to create a first updated word embedding model comprises updating a portion of the neural network to adjust weights and biases associated with neurons of the hidden layer based on the second set of streaming data, the processor being further configured to:
store a representation of an updated hidden layer;
responsive to storing a third set of streaming data, determine that an amount of the third set of streaming data exceeds the second predetermined threshold, wherein the third set of streaming data is received chronologically after the second set of streaming data; and
update, based on the third set of streaming data and the stored representation of the updated hidden layer of the neural network, the first updated word embedding model to create a second updated word embedding model.

25. The system of claim 24, the processor being further configured to:
responsive to receiving a query of the word embedding model during streaming of the streaming data and before updating the word embedding model to create the first updated word embedding model, generate results of the query based on the word embedding model;
responsive to receiving a query of the word embedding model during streaming of the streaming data, after updating the word embedding model to create a first updated word embedding model and before updating the word embedding model to create the second updated word embedding model, generate results of the query based on the first updated word embedding model; and
responsive to receiving a query of the word embedding model during streaming of the streaming data and after updating the word embedding model to create the second updated word embedding model, generate results of the query based on the second updated word embedding model.

* * * * *